(12) United States Patent
Millar et al.

(10) Patent No.: US 11,375,258 B2
(45) Date of Patent: Jun. 28, 2022

(54) TRANSITIONING BETWEEN BROADCAST AND UNICAST STREAMS

(71) Applicant: TRITON US VP ACQUISITION CO., Costa Mesa, CA (US)

(72) Inventors: Keith Millar, Brentford (GB); Robert Edward May, London (GB)

(73) Assignee: TRITON US VP ACQUISITION CO., Costa Mesa, CA (US)

( * ) Notice: Subject to any disclaimer, the term of this patent is extended or adjusted under 35 U.S.C. 154(b) by 17 days.

(21) Appl. No.: 16/841,888

(22) Filed: Apr. 7, 2020

(65) Prior Publication Data

US 2020/0236413 A1 Jul. 23, 2020

Related U.S. Application Data

(63) Continuation of application No. 14/795,353, filed on Jul. 9, 2015, now Pat. No. 10,652,603.

(51) Int. Cl.
*H04N 21/2665* (2011.01)
*H04N 21/262* (2011.01)
*H04N 21/462* (2011.01)
*H04N 21/6408* (2011.01)
*H04N 21/845* (2011.01)
*H04N 21/2343* (2011.01)
*H04N 21/2362* (2011.01)
(Continued)

(52) U.S. Cl.
CPC ....... *H04N 21/2665* (2013.01); *H04N 21/235* (2013.01); *H04N 21/2362* (2013.01); *H04N 21/23439* (2013.01); *H04N 21/26258* (2013.01); *H04N 21/438* (2013.01); *H04N 21/43072* (2020.08); *H04N 21/4622* (2013.01); *H04N 21/6408* (2013.01); *H04N 21/8456* (2013.01)

(58) Field of Classification Search
CPC ......... H04N 21/23439; H04N 21/2362; H04N 21/26258; H04N 21/4622; H04N 21/438; H04N 21/8456; H04N 21/235; H04N 21/4307; H04N 21/2665; H04N 21/6408
See application file for complete search history.

(56) References Cited

U.S. PATENT DOCUMENTS 7,631,080 B2   12/2009   Epstein et al.
7,882,233 B2   2/2011    Epstein et al.
(Continued)

FOREIGN PATENT DOCUMENTS

CN   102598691 A   7/2012

OTHER PUBLICATIONS

Alex Giladi, "On files and multicasts: non-HTTP sources and DASH" 101.MPEG Meeting, Jul. 12, 2012, XP030054124.
(Continued)

*Primary Examiner* — Chenea Davis
(74) *Attorney, Agent, or Firm* — Fernando & Partners, LLP

(57) ABSTRACT

In one embodiment, a method includes identifying a plurality of segments of media content, each of the plurality of segments including a plurality of media frames, generating segment metadata for each of the plurality of segments, the segment metadata including a segment identifier, transmitting a broadcast stream including the plurality of segments and the segment metadata for each of the plurality of segments, and making the plurality of segments available for retrieval via a unicast stream using the segment identifiers.

20 Claims, 7 Drawing Sheets

(51) Int. Cl.
*H04N 21/43* (2011.01)
*H04N 21/235* (2011.01)
*H04N 21/438* (2011.01)

(56) References Cited

U.S. PATENT DOCUMENTS

| | | |
|---|---|---|
| 7,945,672 B2 | 5/2011 | Epstein et al. |
| 8,468,249 B2 | 6/2013 | Epstein et al. |
| 8,931,019 B2 * | 1/2015 | Hirano ............... H04N 21/4307 725/88 |
| 2007/0226810 A1 | 9/2007 | Hotti |
| 2010/0306792 A1 | 12/2010 | Li et al. |
| 2011/0134991 A1 * | 6/2011 | Gregotski ............... H04N 19/48 375/240.01 |
| 2012/0042089 A1 * | 2/2012 | Chen ................... H04N 21/8456 709/231 |
| 2012/0269075 A1 | 10/2012 | Fernandes |
| 2012/0297410 A1 | 11/2012 | Lohmar et al. |
| 2013/0182643 A1 | 7/2013 | Pazos |
| 2013/0290555 A1 * | 10/2013 | Einarsson ............... G06F 16/40 709/231 |
| 2013/0294321 A1 | 11/2013 | Wang |
| 2014/0075042 A1 | 3/2014 | Giladi |
| 2016/0182923 A1 * | 6/2016 | Higgs ............... H04N 21/23424 725/34 |
| 2016/0269771 A1 | 9/2016 | Bangma et al. |
| 2016/0269801 A1 * | 9/2016 | Harden ............... H04N 21/6408 |
| 2016/0352791 A1 | 12/2016 | Adams et al. |

OTHER PUBLICATIONS

International Search Report and Written Opinion, International Application No. PCT/US2016/036806, dated Aug. 23, 2016, pp. 1-11.
International Preliminary Report on Patentability, International Application No. PCT/US2016/036806, dated Jan. 9, 2018, pp. 1-9.
Office Action, Chinese Application No. 201680040393.6, dated Oct. 29, 2019, pp. 1-13.

* cited by examiner

TRANSITIONING BETWEEN BROADCAST AND UNICAST STREAMS

CROSS-REFERENCE TO RELATED APPLICATION

This application is a continuation of U.S. patent application Ser. No. 14/795,353, filed on Jul. 9, 2015, the contents of which are hereby incorporated by reference for all purposes.

TECHNICAL FIELD

The present disclosure relates generally to media streams, and in particular, to systems, methods and apparatuses enabling synchronization of broadcast and unicast media streams.

BACKGROUND

The ongoing development, maintenance, and expansion of network-based content provisioning system involves providing more content to users and providing more flexibility in the timing of the users' consumption of the content. To that end, such systems can provide content to a user via a broadcast stream (in which content is transmitted to many users simultaneously) or a unicast stream (in which content is transmitted to a particular user).

In some circumstances, a broadcast stream including content and a unicast stream including the same content are treated independently, resulting in a redundant use of network bandwidth. In some circumstances, switching between a broadcast stream and a unicast stream of the same content can result in data loss or delay in rendering the content of the stream.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
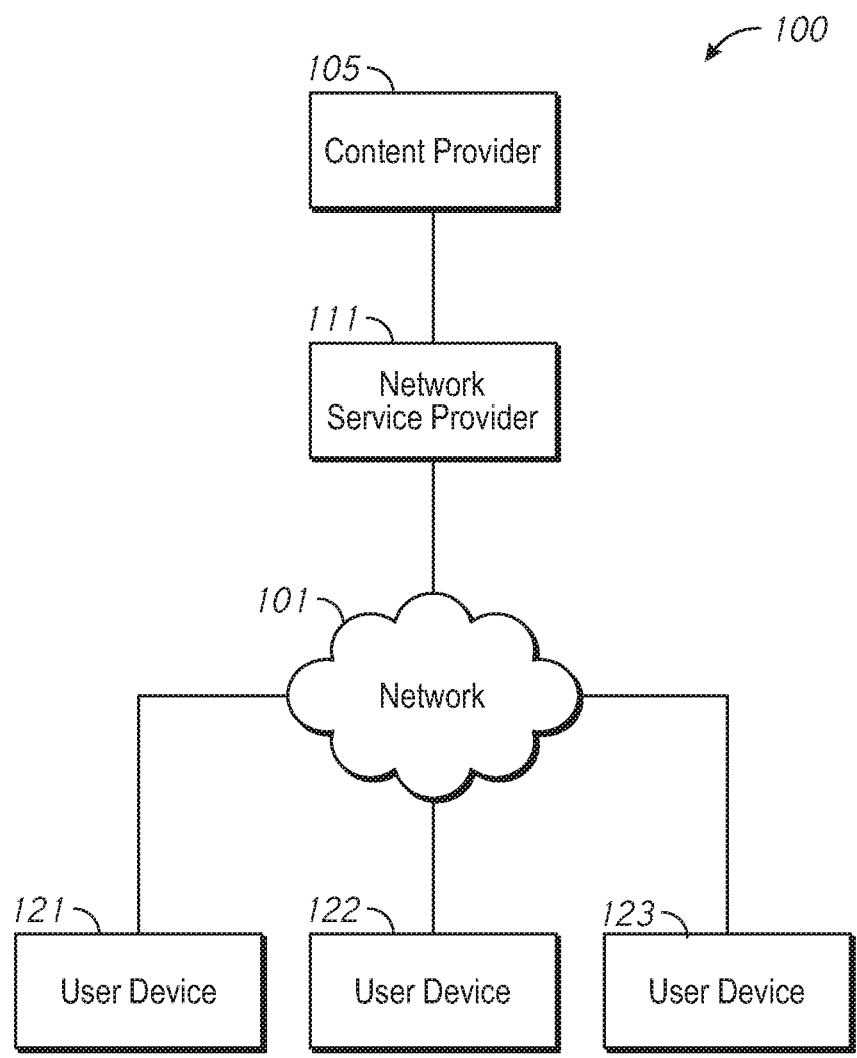
FIG. 1 is a block diagram of a data network in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for seamlessly transitioning between a broadcast stream and a unicast stream. For example, in some implementations, a method includes identifying a plurality of segments of media content, each of the plurality of segments including a plurality of media frames, generating segment metadata for each of the plurality of segments, the segment metadata including a segment identifier, transmitting a broadcast stream including the plurality of segments and the segment metadata for each of the plurality of segments, and making the plurality of segments available for retrieval via a unicast stream using the segment identifiers.

In other implementations, a method includes receiving a broadcast stream, the broadcast stream including a first segment of media content and data identifying the first segment, identifying, based on the data identifying the first segment, a second segment of the media content, downloading the second segment from a unicast server, and rendering the first segment and the second segment without delay between the first segment and the second segment.

In other implementations, a method includes downloading a first segment of media content from a unicast server, receiving a broadcast stream including a plurality of broadcast segments and data identifying the plurality of broadcast segments, identifying, based on the data identifying the broadcast segments, one of the plurality of broadcast segments as a second segment of the media content, and rendering the first segment and the second segment without delay between the first segment and the second segment.

Example Embodiments

A user device can consume content from a number of different sources. For example, in some implementations, the user device renders media content (e.g., video content, audio content, streaming text, etc.) received as a broadcast stream via a cable or satellite network or media content received as a unicast stream via an Internet Protocol (IP) network. In some implementations, the user device can seamlessly transition between the broadcast stream and the unicast stream.

Enabling user devices to switch from a unicast stream of content to a broadcast stream of the content allows network service providers to save on delivery costs due to the reduced number of unicast downloads. In some implementations, where the broadcast channel is of better quality than the unicast channel (e.g., a higher data rate), switching from a unicast stream via the unicast channel to a broadcast stream via the broadcast channel results in a higher quality user experience. Enabling user devices to switch from a broadcast stream of content to a unicast stream of the content allows users of the user devices more flexibility in the timing of their consumption of the content.

As an example, a user device may tune to a broadcast channel having missed the first few minutes of media content (e.g., a television program or live sporting event). The user device can cache the broadcast stream while downloading (via a unicast stream) the missed media content. After a few minutes of rendering the media content, the user device transitions from the unicast stream (of the missed media content) to the broadcast stream (from the buffer of the user device). As described below, the broadcast stream and unicast stream may be conditioned such that this transition is performed seamlessly.

As another example, a user device may tune to a broadcast channel and after some time, pause playback of the content. While playback is paused, the user device buffers the content received via the broadcast stream. In some implementations, the buffer of the user device may fill before playback is resumed. For example, in some implementations, the user device is a mobile device. Thus, upon resuming playback of the content, the user device renders at least a portion of the buffered content (e.g., the broadcast stream) and transitions to a unicast stream to obtain the remainder of the content. In some implementations, the user device may fast-forward through a portion of the content and transition back to the broadcast stream (as described above).

FIG. 1 is a block diagram of a data network 100 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, the data network 100 includes a network service provider 111 coupled, via a network 101, to a number of user devices 121-123. The network 101 includes any public or private LAN (local area network) and/or WAN (wide area network), such as an intranet, an extranet, a virtual private network, a cable or satellite network, and/or portions of the Internet. Each user device 121-123 is a device including a suitable combination of hardware, firmware, and software for performing one or more functions.

The network service provider 111 receives content, such as video data, from one or more content providers 105 and provides the content to the user devices 121-123 via the network 101. The network service provider 111 can, at various times, provide the content as a broadcast stream transmitted to more than one of the user devices 121-123 or as a unicast stream transmitted to a specific one of the user devices 121-123. In some implementations, the unicast stream is addressed to a specific one of the user devices 121-123 using an Internet Protocol (IP), such as a stream of packets including an IP address of the specific one of the user devices 121-123.

In some implementations, the user device 121 is a set-top box (STB) for, among other things, viewing television programming and/or videos. The user device 121 includes one or more input devices such as a remote control and/or buttons and one or more output devices such as a television display and/or LED (light emitting diode) indicators. In some implementations, the user device 121 receives content provided as a broadcast stream at set times. In some implementations, the user device 121 receives content as a unicast stream on-demand. In various implementations, the user devices 121-123 include a personal computer, a smartphone, or other various devices.

The user device 121 is configured to seamlessly transition between a broadcast stream of content and a unicast stream of the content. For example, in some implementations, the user device 121 receives a first segment of content via a broadcast stream, downloads a second segment of content, and renders the first segment and the second segment without delay between the first segment and the second segment. In some implementations, the user device 121 downloads a first segment of content, receives a second segment of content via a broadcast stream, and renders the first segment and the second segment without delay between the first segment and the second segment.

The user device 121 renders the first segment and the second segment without delay between the segments such that a user of the user device 121 would not notice the transition between the broadcast and unicast streams. For example, in some implementations, the user device 121 renders the first segment and the second segment without stuttering of video or without glitching of audio.

Figure 2:
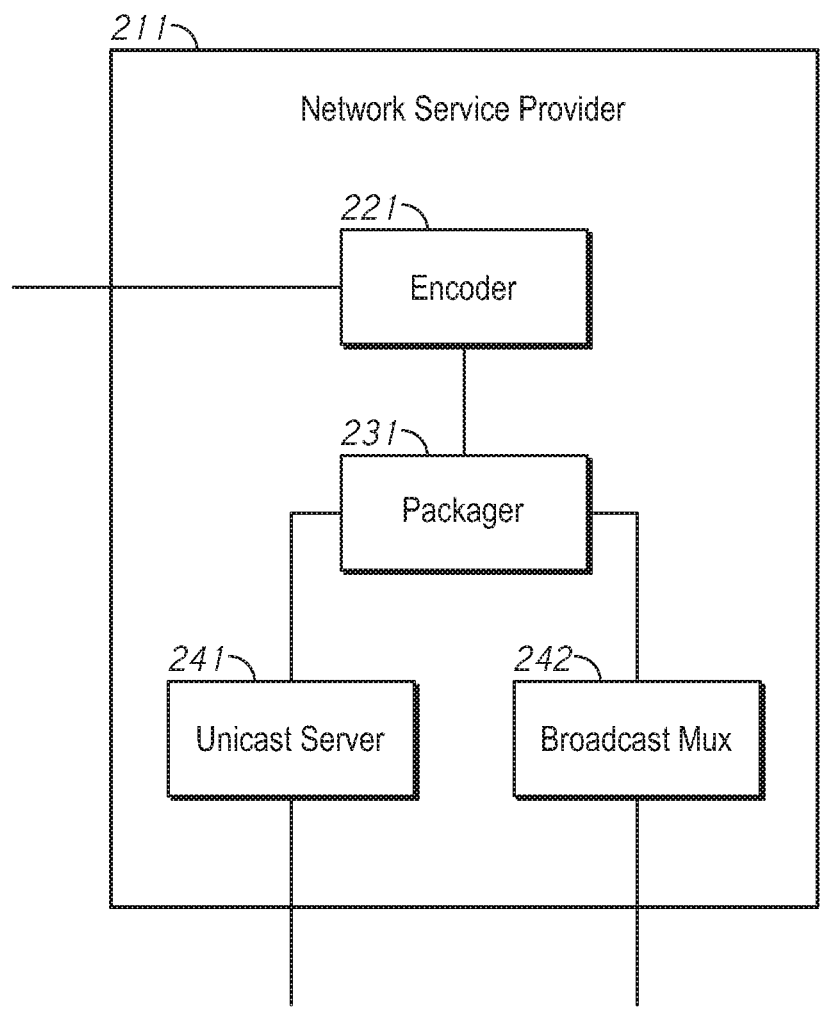
FIG. 2 is a block diagram of a network service provider in accordance with some implementations.

FIG. 2 is a block diagram of a network service provider 211 in accordance with some implementations. The network service provider 211 receives media content in the form of video data (which may include corresponding audio data) from one or more content service providers. The video data is fed into an encoder 221 that encodes the video data. In some implementations, the video data is received from a content provider in an encoded format and the encoder 221 is absent or not utilized. In some implementations, the encoded video data is encoded in an adaptive bit rate (ABR) format.

The encoded video data is provided to a packager 231 that identifies or defines segments of the encoded video data. Thus, the output of the packager 231 includes segment data including a sequence of segments of encoded video data and segment metadata including at least a segment identifier for each of the segments. As described in detail below, the segment metadata may further include additional information for each of the segments, such as a segment size. In various implementations, the segments include approximately 2 to 10 seconds of content. Thus, at a frame rate of approximately 25 or 30 frames per second, each segment includes approximately 50 to 250 or 60 to 300 frames of video data.

In some implementations, each segment of the encoded video data is self-describing and decodable. In particular, in some implementations, each segment of the encoded video data can be rendered by a user device independently of other segments. Further, in some implementations, each segment including video data further includes corresponding audio data to be rendered simultaneously with the video data. In some implementations, the segment includes all video frames and audio frames for the segment's time period of content.

The segment data and segment metadata are provided to both a unicast server 241 and a broadcast multiplexer 242. The unicast server 241 makes the segment data, indexed by the segment metadata, available for retrieval by a user device via a unicast stream. In some implementations, making the segment data, indexed by the segment metadata, available for retrieval by a user device via a unicast stream includes uploading the segment data to a unicast server (e.g., an origin server of a content delivery network) and generating an updated manifest based on the segment metadata (e.g., by updating an existing manifest or generating a new manifest). For example, in some implementations, generating the updated manifest based on the segment metadata includes adding an entry including the segment identifier and a location (e.g., a uniform resource locator (URL)) at which the segment can be downloaded. In some implementations, the segment identifier is the URL.

The broadcast multiplexer 242 transmits a broadcast stream to multiple user devices including the segment data and the segment metadata. In some implementations, the broadcast multiplexer 242 transmits multiple multiplexed broadcast streams, e.g., multiple channels carrying different content. In some implementations, the broadcast stream is transmitted to each of a plurality of user devices via a cable broadcasting network or a satellite broadcasting network. In some implementations, the broadcast stream is transmitted to each of a plurality of user devices via IP multicast or a terrestrial broadcasting network.

In some implementations, the network service provider 211 receives the content and transmits the content via the broadcast stream at a later set time. Such transmission may be referred to a broadcasting prerecorded content. In some implementations, the network service provider 211 receives the content and transmits the content via the broadcast stream as it is received. Such transmission may be referred to a broadcasting live content.

In some implementations, the network service provider 211 makes all of the segment data of prerecorded content, indexed by the segment metadata, available for retrieval by a user device via a unicast stream before broadcasting the prerecorded content. In some implementations, the network service provide 211 makes segment data of prerecorded content, indexed by the segment metadata, available for retrieval by a user device via a unicast stream as the prerecorded content is being broadcast. For example, in some implementations, each segment is made available for retrieval just before or just after the segment is broadcast.

In some implementations, the network service provider 211 makes segment data of live content available for retrieval by a user device via a unicast stream as the live content is being broadcast. In some implementations, each segment is made available for retrieval just after the segment is broadcast. For example, in some implementations, once a segment has been broadcast, the segment is uploaded to a unicast server and an updated manifest is generated. As it can take some time (e.g., 1 second) to upload the segment and generate the updated manifest, such a delay between broadcasting and availability on a unicast server may be disadvantageous. Thus, in some implementations, the network service provider 211 delays broadcasting of received live content such that each segment is broadcast and uploaded to a unicast server at the same time. Then, the network service provider 211 generates the updated manifest just after the segment is broadcast.

In some implementations, the network service provider 211 delays the broadcasting of received live content because the packager 231 generates a segment (including segment metadata regarding the size of the segment) before the first packet of the segment is broadcast. In some circumstances, delaying the broadcasting of received live content may be undesirable (e.g., a live sporting event). Thus, in some implementations, the packaging of video data into segments is disabled for selected content or selected channels.

Figure 3:
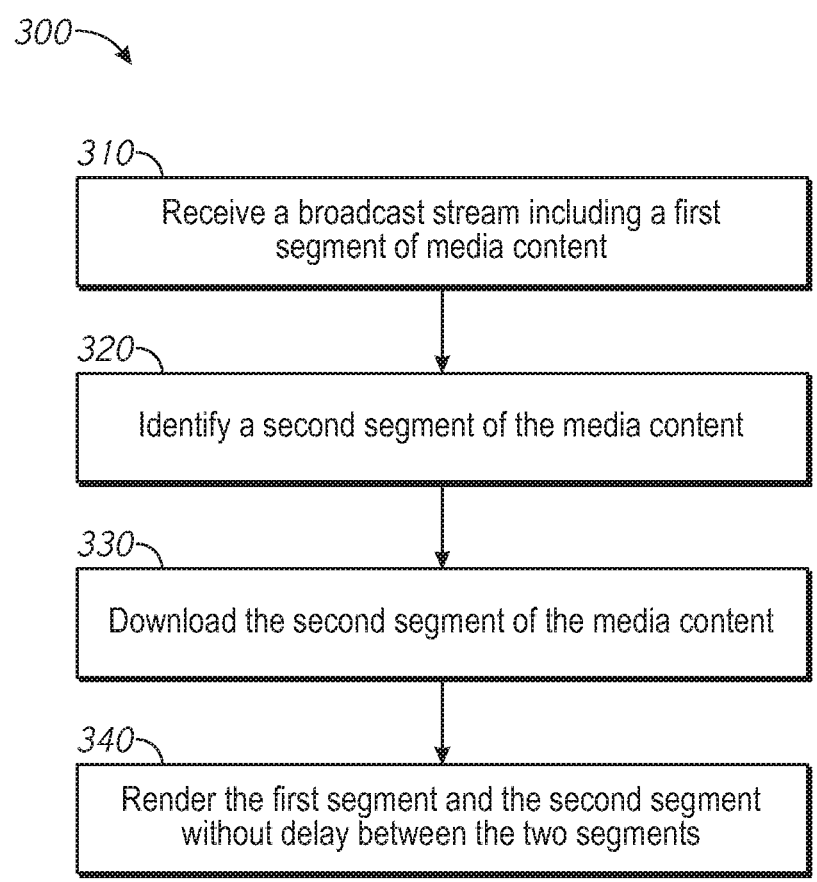
FIG. 3 is a flowchart representation of a method of seamlessly transitioning from a broadcast stream to a unicast stream in accordance with some implementations.

FIG. 3 is a flowchart representation of a method 300 of seamlessly transitioning from a broadcast stream to a unicast stream in accordance with some implementations. In some implementations (and as detailed below as an example), the method 300 is performed by a user device, such as the user device 121 of FIG. 1. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes receiving a first segment via a broadcast stream, identifying and downloading a second segment from a unicast server, and rendering the two segments without delay between the segments.

The method 300 begins, in block 310, with the user device receiving a broadcast stream including a first segment of media content and data identifying the first segment. In various implementations, the media content includes video content, audio content, textual content, or other forms of consumable content. In some implementations, the broadcast stream includes a plurality of segments of media content, each of the segments including a plurality of media frames. In some implementations, the media frames include video frames. In various implements, the segments include approximately 2 to 10 seconds of video data. In some implementations, each segment of the media content can be rendered by a user device independently of other segments. In some implementations, each segment further includes corresponding media content to be rendered simultaneously with the media content. For example, in some implementations, each segment includes video data and further includes corresponding audio data (or subtitle data) to be rendered simultaneously with the video data.

In addition to segments of media content, the broadcast stream includes, for each segment, segment metadata that identifies each segment. For example, in some implementations, the segment metadata includes a segment identifier. In some implementations, the segment identifier is a URL. In some implementations, the segment identifier is a timestamp. The segment identifier may be other types of identifying data.

In some implementations, the segment size varies between segments. Thus, in some implementations, the segment metadata further includes a segment size, e.g. in seconds or bytes. In some implementations, the segment size is fixed and the segment metadata does not include a segment size. As described in detail below, the segment metadata may further include additional information for each of the segments.

In various implementations, the broadcast stream includes the segment metadata in various ways. In some implementations, the segment metadata is included in-band with the segments as a single stream. In some implementations, the segment metadata is included out-of-band as a separate stream from the segments.

In some implementations, the broadcast stream includes a Moving Picture Experts Group transport stream (MPEG-TS). An MPEG-TS includes a number of packets, each of the packets including a header and a packet payload. In some implementations, the header indicates that the packet includes an adaptation field. In some implementations, the segment metadata is included in the adaptation field of the first packet of a segment.

Thus, the user device receives a plurality of segments of media content and associated segment metadata via a broadcast stream. The plurality of segments includes a first segment of media content and the segment metadata associated with the first segment includes data identifying the first segment.

While receiving the broadcast stream, the user device determines to switch from the broadcast stream to a unicast stream. In response, the user device (at block 320) identifies a second segment of the media content based on the data identifying the first segment.

In some implementations, the data identifying the first segment includes a segment number and identifying the second segment includes incrementing the segment number. For example, the data identifying the first segment may include the string "ProgramABC_Segment105" and identifying the second segment may include determining that the second segment is identified by the string "ProgramABC_Segment106". In some implementations, the data identifying the first segment includes a URL with a segment number and identifying the second segment includes incrementing the number. For example, the data identifying the first segment may include the URL "http://content.net/ProgramABC/segments/105" and identifying the second segment may include determining that the second segment may be retrieved at the URL "http://content.net/ProgramABC/segments/106".

In some implementations, the data identifying the first segment includes a segment start time and identifying the second segment includes identifying the start time of the second segment. In some implementations, identifying the start time of the second segment is based on a segment size included in the segment metadata. For example, with a segment size of 10 seconds (either fixed or indicated by the segment metadata), the data identifying the first segment may include the fields "ProgramABC" and "00:01:15" and identifying the second segment may include determining that the second segment is identified by the fields "ProgramABC" and "00:01:25".

In some implementations, the user device identifies the second segment based on a manifest for the media content. In some implementations, in response to determining to switch from the broadcast stream to a unicast stream, the user device downloads a manifest indicating a plurality of segments of the media content and an order of the plurality of segments. In some implementations, the manifest lists the identifiers of the plurality of segments in the order. In some implementations, the manifest includes a table with a plurality of entries, each entry having a field indicating the segment (e.g., the segment identifier) and a field indicating a position in the order. Upon acquiring the manifest, the user device determines the position in the order of the first segment based on the data identifying the first segment, determines the next position in the order, and identifies the second segment as the segment associated with the next position in the order.

Thus, in some implementations, identifying the second segment includes obtaining a manifest indicating a plurality of segments of the media content and an order of the plurality of segments and identifying, as the second segment, a next segment following the first segment in the order of the plurality of segments.

In some implementations, as the broadcast stream may be running ahead of the unicast stream, the manifest may not include the first segment when the user device first obtains it. Thus, in some implementations, the user device obtains an earlier manifest before obtaining the manifest that includes the first segment. After a delay (e.g., one second, approximately half a segment, or any other time) the user device obtains a later manifest, e.g., the manifest used to identify the second segment.

Thus, in some implementations, obtaining the manifest includes obtaining an earlier manifest indicating an earlier plurality of segments of the media content and an order of the earlier plurality of segments and obtaining the manifest after a delay in response to determining that the first segment is not included in the earlier plurality of segments. Once the manifest is obtained including the first segment, the user device identifies, as the second segment, a next segment following the first segment in the order of the plurality of segments.

At block 330, the user device downloads the second segment from a unicast server. In some implementations, identifying the second segment includes identifying a URL at which the second segment may be retrieved and downloading the second segment includes downloading the second segment at the URL. In some implementations, the data identifying the segment is the URL. In some implementations, the user device determines the URL based on the segment identifier. For example, the segment identifier may be "ProgramABC_Segment106" and the user device may parse the segment identifier to determine the URL as "http://content.net/ProgramABC/segments/106".

At block 340, the user device renders the first segment and the second segment without delay between the first segment and the second segment. In some implementations, rendering the first segment and the second segment includes displaying, on a monitor or screen, video frames of the first segment followed by video frames of the second segment, wherein each video frame is displayed for a display period (the inverse of the frame rate). In some implementations, the two segments are rendered such that the last video frame of the first segment is displayed for the display period and the first video frame of the last segment is displayed for the display period immediately following the display period of the last video frame of the first segment.

In some implementations, the user device renders the first segment and the second segment using dual decoders to decode the first segment and the second segment and switches from displaying the first segment to displaying the second segment at the baseband level. In some implementations, the user device switches from decoding the first segment to decoding the second segment at the transport stream or elementary stream layer. In some implementations, where the first segment and the second segment are in different formats, the user device converts the first segment and the second segment into a common container format.

In some implementations, when consuming the broadcast stream, the user device makes use of a program clock reference (PCR) included in the broadcast stream to synchronize its internal clock and cause the consumption rate to match that of the transmission rate. In some implementations, when consuming the unicast stream, the user device relies on its own internal clock and a buffer to compensate for variations in the consumption rate and transmission rate. However, in some implementations, the user device makes use of the PCR (or another clock, timestamp, or temporal reference included in the broadcast stream) while consuming the unicast stream to cause the consumption rate of the unicast stream to match that of the transmission rate of the broadcast stream. Thus, in some implementations, receiving the broadcast stream (in block 310) includes receiving a broadcast stream clock used in rendering the first segment (during broadcast stream consumption) and in rendering the second segment (during unicast stream consumption).

In some implementations, when transitioning from the broadcast stream to the unicast stream, the user device maps presentation time information of the unicast stream to the PCR of the broadcast stream. In some implementations, the segment metadata of the broadcast steam and the segment metadata of the unicast stream both include a common PCR that can be used by the user device to render the first segment and the second segment at the correct time. In some implementations, the segment metadata of the broadcast stream and segment metadata of the unicast stream include different clock references and the user device maps between the different clock references to render the first segment and the second segment at the correct time. In various implementations, the presentation time information of the second segment is included in the segment metadata, the manifest, or other locations.

Once the user device begins rendering the second segment, the user device has switched from rendering a broadcast stream to rendering a unicast stream. Thus, in some implementations, the user device discontinues receiving the broadcast stream. In particular, in some implementations, receiving the broadcast stream (in block 310) does not include receiving the second segment. However, as noted above, in some implementations, the user device continues to receive the broadcast stream for at least the limited purpose of extracting the broadcast stream clock.

To continue rendering the unicast stream, in some implementations, the user device identifies, as a third segment, a next segment following the second segment in the order of the plurality of segments indicated by the manifest, downloads the third segment from the unicast server, and renders the third segment without delay between the second segment and the third segment. In some implementations, the manifest does not include the third segment and thus, to identify the third segment, the user device obtains an updated manifest including the third segment.

Although the blocks of the method 300 are described in a particular order, the steps associated with each block may be performed sequentially in any order, simultaneously, or overlapping in time. For example, in some implementations, the user device renders the first segment (in block 340) while identifying and downloading the second segment (in block 320 and 330).

Figure 4:
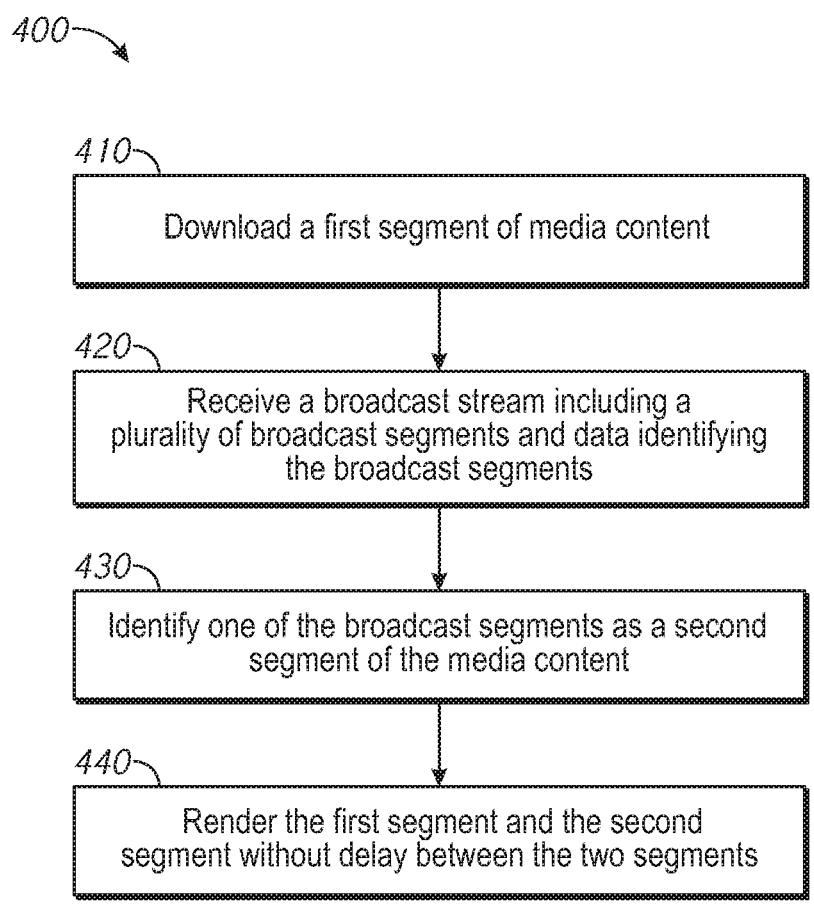
FIG. 4 is a flowchart representation of a method of seamlessly transitioning from a unicast stream to a broadcast stream in accordance with some implementations.

FIG. 4 is a flowchart representation of a method 400 of seamlessly transitioning from a unicast stream to a broadcast stream in accordance with some implementations. In some implementations (and as detailed below as an example), the method 400 is performed by a user device, such as the user device 121 of FIG. 1. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes receiving a first segment via a broadcast stream, identifying and downloading a second segment from a unicast server, and rendering the two segments without delay between the segments.

The method 400 begins, at block 410, with the user device downloading a first segment of media content from a unicast server. In various implementations, the media content includes video content, audio content, image content, text content, or other forms of consumable content. In some implementations, the user device downloads a plurality of segments of media content, each of the segments including a plurality of media frames, and renders the segments as a unicast stream. In some implementations, the media frames include video frames. In various implements, the segments include approximately 2 to 10 seconds of video data. In some implementations, each segment of the media content can be rendered by a user device independently of other segments. In some implementations, each segment further includes corresponding media content to be rendered simultaneously with the media content. For example, in some implementations, each segment includes video data and further includes corresponding audio data (or subtitle data) to be rendered simultaneously with the video data.

While rendering the unicast stream, the user device determines to switch from the unicast stream to a broadcast stream. In response, the user device (at block 420) begins receiving a broadcast stream including a plurality of broadcast segments and data identifying the broadcast segments. As described above, in addition to segments of media content, the broadcast stream includes, for each segment, segment metadata that identifies each segment. For example, in some implementations, the segment metadata includes a segment identifier. In some implementations, the user device caches the broadcast segments as they are received.

At block 430, the user device identifies, based on the data identifying the broadcast segments, one of the plurality of broadcast segments as a second segment of the media content. In some implementations, the user device identifies the second segment based on data identifying the first segment (e.g., used to download the first segment in block 410).

In some implementations, the data identifying the first segment includes a segment number and the data identifying the broadcast segments includes a segment number for each of the broadcast segments. Thus, in some implementations, identifying one of the plurality of broadcast segments as the second segment includes identifying the one of the plurality of broadcast segments having a segment number incremented from the segment number of the first segment. For example, the data identifying the first segment may include the string "ProgramABC_Segment105" and the data identifying the broadcast segments may include, for three broadcast segments, "ProgramABC_Segment105", "ProgramABC_Segment106", and "ProgramABC_Segment107". Thus, the user device may identify the second of the broadcast segments as the second segment of media content.

In some implementations, the data identifying the first segment includes a segment start time and the data identifying the broadcast segments includes a segment start time for each of the broadcast segments. Thus, in some implementations, identifying one of the plurality of broadcast segments as the second segment includes identifying the start time of the second segment. In some implementations, identifying the start time of the second segment is based on a segment size included in the segment metadata. For example, with a segment size of 10 seconds (either fixed or indicated by the segment metadata), the data identifying the first segment may include the field "00:01:15" and the data identifying the broadcast segments may include the fields "00:01:10", "00:01:15", and "00:01:25". Thus, the user device may identify the third of the broadcast segments as the second segment of media content.

In some implementations, the user device identifies the one of the plurality of broadcast segments as the second segment based on a manifest for the media content. In some implementations, the manifest indicates a plurality of segments of the media content and an order of the plurality of segments. In some implementations, the manifest lists the identifiers of the plurality of segments in the order. In some implementations, the manifest includes a table with a plurality of entries, each entry having a field indicating the segment (e.g., the segment identifier) and a field indicating a position in the order. Based on the manifest, the user device determines the position in the order of the first segment (e.g., based on the data identifying the first segment), determines the next position in the order, determines the segment identifier of the segment in the next position in the order, and identifies the one of the plurality of broadcast segments having that segment identifier.

Thus, in some implementations, identifying the second segment includes obtaining a manifest indicating a plurality of segments of the media content and an order of the plurality of segments and identifying, as the second segment, a next segment following the first segment in the order of the plurality of segments.

In some implementations, as the broadcast stream may be running ahead of the unicast stream, the manifest may not include the second segment when the user device first obtains it. Thus, in some implementations, the user device obtains an earlier manifest before obtaining the manifest that includes the second segment. After a delay (e.g., one second, approximately half a segment, or any other time) the user device obtains a later manifest, e.g., the manifest used to identify the one of the plurality of broadcast segments as the second segment.

At block 440, the user device renders the first segment and the second segment without delay between the first segment and the second segment. In some implementations, the user device renders the first segment followed by the second segment without delay between the two segments. In some implementations, rendering the first segment and the second segment includes displaying, on a monitor or screen, video frames of the first segment followed by video frames of the second segment, wherein each video frame is displayed for a display period (the inverse of the frame rate). In some implementations, the two segments are rendered such that the last video frame of the first segment is displayed for the display period and the first video frame of the last segment is displayed for the display period immediately following the display period of the last video frame of the first segment.

In some implementations, the user device renders the first segment and the second segment using dual decoders to decode the first segment and the second segment and switches from displaying the first segment to displaying the second segment at the baseband level. In some implementations, the user device switches from decoding the first segment to decoding the second segment at the transport stream or elementary layer. In some implementations, where the first segment and the second segment are in different formats, the user device converts the first segment and the second segment into a common container format.

Once the user device begins rendering the second segment, the user device has switched from rendering a unicast stream to rendering a broadcast stream. Thus, in some implementations, the user device discontinues obtaining the unicast stream.

To continue rendering the broadcast stream, in some implementations, the user device renders additional segments (of the plurality of segments) in the order they are received following the second segment.

Although the blocks of the method 400 are described in a particular order, the steps associated with each block may be performed sequentially in any order, simultaneously, or overlapping in time. For example, in some implementations, the user device renders the first segment (and/or additional segments downloaded prior to the first segment) while receiving the broadcast stream and identifying the second segment.

The ability of a user device to transition between a broadcast stream and a unicast stream (as described above with respect to FIGS. 3 and 4) enables a number of different user cases. In some implementations, the methods 300 and 400 of FIGS. 3 and 4 enable trick mode support, in which a user device can, among other things, pause, rewind, or fast-forward while rendering content. In some implementations, the methods 300 and 400 of FIGS. 3 and 4 enable content insertion, such as ad substitution.

In some implementations, when a user device is rendering a broadcast stream and receives a user input to pause or rewind, the user device switches from a broadcast stream to a unicast stream (as described above with respect to FIG. 3). In some implementations, such a switch results in the cache of the user device being flushed, downloading I-frames from previous segments from a unicast server, and rendering the I-frames to user. Upon resuming normal playback, the user device continues to download and render segments from the unicast server.

In some implementations, when a user device receives a user input to fast-forward, the user device downloads I-frames from subsequent segments from the unicast server and renders the I-frames to the user. When the user device detects that it has reached the end of the available content on the unicast server, the user device resumes normal playback and switches to the broadcast stream (as described above with respect to FIG. 3).

In some implementations, when a user device is rendering a broadcast stream and receives a content insertion marker or other placement opportunity signal, the user device switches from a broadcast stream to a unicast stream (as described above with respect to FIG. 3). In some implementations, the content insertion marker is included in the broadcast stream, e.g., in the segment metadata. In some implementations, the content insertion marker is received from an out-of-band source. In some implementations, the content of the unicast stream differs from that of the broadcast stream in that segments corresponding to the content insertion marker are replaced with alternative segments, e.g., a substitute advertisement.

Figure 5:
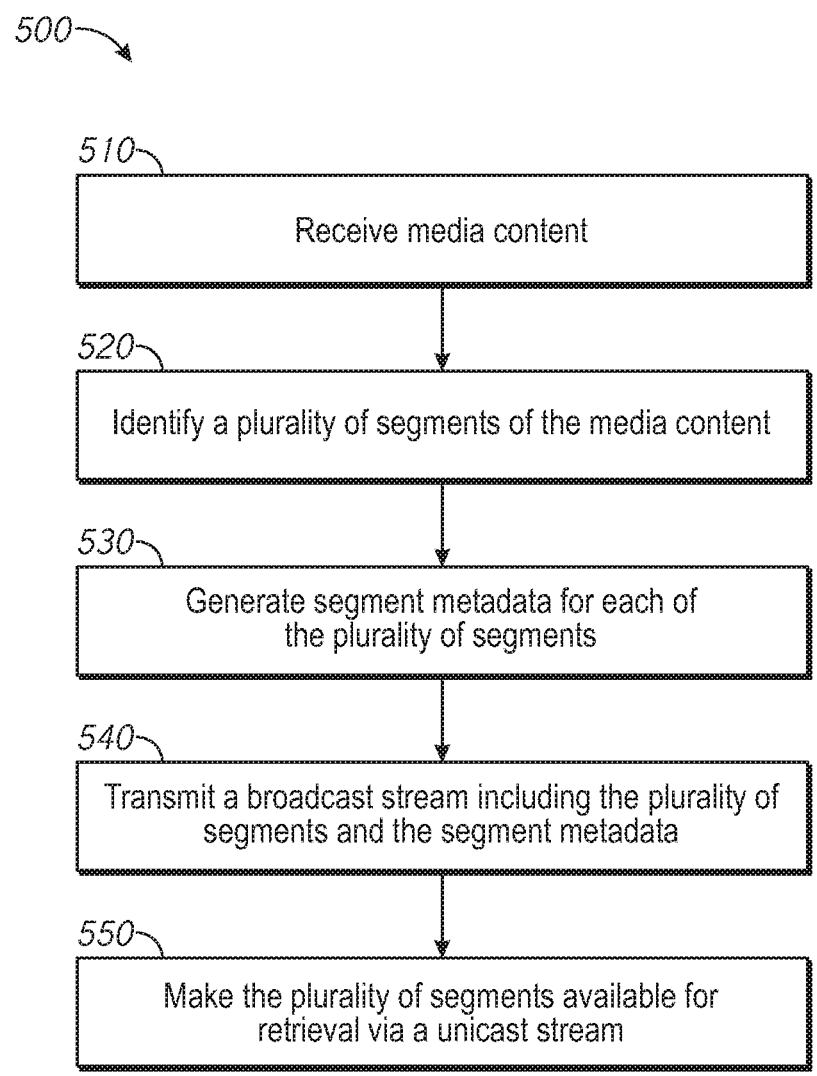
FIG. 5 is a flowchart representation of a method of transmitting content as a broadcast stream and a unicast stream in accordance with some implementations.

FIG. 5 is a flowchart representation of a method 500 of transmitting content as a broadcast stream and a unicast stream in accordance with some implementations. In some implementations (and as detailed below as an example), the method 500 is performed by a network service provider, such as the network service provider 111 of FIG. 1. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes identifying a plurality of segments of media content and transmitting the segments (with data identifying the segments) via a broadcast stream and a unicast stream.

The method 500 begins, at block 510, with the network service provider receiving media content. In some implementations, the network service provider receives the media content from a content provider. In various implementations, the media content includes video content, audio content, image content, text content, or other forms of consumable content. In various implementations, the media content includes prerecorded video data or live video data. In various implementations, the media content includes encoded video data or unencoded video data.

At block 520, the network service provider identifies a plurality of segments of the media content. In some implementations, identifying the plurality of segments includes generating the plurality of segments based on the received media content. In some implementations, identifying the plurality of segments includes identifying (or generating) portions of the media content that can be rendered by a user device independently of other segments. Thus, in some implementations, each of the plurality of segments can be rendered by a user device independently of others of the plurality of segments. In some implementations, each segment includes a plurality of media frames, e.g., video frames. In various implementations, each segment includes approximately 2 to 10 seconds of video data. Thus, at a frame rate of approximately 25 or 30 frames per second, each segment includes approximately 50 to 250 or 60 to 300 frames of video data.

At block 530, the network service provider generates segment metadata for each segment. The segment metadata for a segment includes a segment identifier for the segment. In some implementations, the segment identifier is a URL (e.g., a URL at which the segment may be downloaded by a user device). In some implementations, the segment identifier is a timestamp. The segment identifier may be other types of identifying data.

In some implementations, the segment metadata includes a segment size. In various implementations, the segment size is indicated in bytes, frames, packets, seconds, system clock units, or any other measure. In some implementations, a user device receiving a segment via a broadcast stream uses the segment size to infer a number of lost packets in a segment and determine whether the segment should be discarded (and possibly acquired via a unicast stream). Similarly, in some implementations, a user device may not receive the packet signaling the start of a new segment, resulting in the reception of more segment data than the segment metadata indicates. In some implementations, the user device also discards such a segment.

In some implementations, the segment metadata includes information regarding a previous segment in a presentation order. For example, in some implementations, the segment metadata includes a segment identifier of the previous segment. In some implementations, the segment metadata includes a presentation time of the first media frame of the previous segment. For the first segment in the presentation order, in various implementations, such a field is left blank, set to zero, or set to the presentation time of the current segment. In some implementations, the segment metadata includes a duration (or other measure of size) of the previous segment. For the first segment in the presentation order, in various implementations, such a field is left blank or set to zero.

In some implementations, the segment metadata includes information regarding a next segment in the presentation order. For example, in some implementations, the segment metadata includes a segment identifier of the next segment, a size of the next segment, and/or a presentation time of the next segment.

At block 540, the network service provider broadcasts the plurality of segments and data identifying the plurality of segments. For example, in some implementations, the network service provider broadcasts the data identifying the plurality of segments by broadcasting segment metadata including such identifying data. In some implementations, the segment metadata is included in-band with the segments as a single broadcast stream. In some implementations, the segment metadata is included out-of-band as a separate broadcast stream from the segments.

In some implementations, the broadcast stream includes a Moving Picture Experts Group transport stream (MPEG-TS). An MPEG-TS includes a number of packets, each of the packets including a header and a packet payload. In some implementations, the header indicates that the packet includes an adaptation field. In some implementations, the segment metadata is included in the adaptation field of the first packet of a segment. Thus, in some implementations, for at least one of the plurality of segments, transmitting the broadcast stream includes transmitting the segment metadata for the one of the plurality of segments in an adaptation field of a first packet of the one of the plurality of segments.

At block 550, the network service provider makes the plurality of segments available for retrieval by a user device using the segment identifiers. In some implementations, the network service provider makes the plurality of segments, indexed by the segment identifiers, available for retrieval by a user device via a unicast stream. In some implementations, making the plurality of segments, indexed by segment identifier, available for retrieval by a user device via a unicast stream includes uploading the plurality of segments to a unicast server (e.g., an origin server of a content delivery network) and generating an updated manifest based on the segment metadata (e.g., by updating an existing manifest or generating a new manifest). For example, in some implementations, generating the updated manifest based on the segment metadata includes adding entries including the segment identifiers and respective locations (e.g., a uniform resource locators (URLs)) at which the segments can be downloaded. In some implementations, the segment identifier and the respective location is indicated with a single URL.

As described above, the inclusion of the segment metadata in the broadcast stream allows a user device to seamlessly transition between the broadcast stream and a unicast stream. In some implementations, the inclusion of segment metadata in the broadcast stream also allows simultaneous rendering of the broadcast stream and out-of-band data (e.g., an alternate audio track or complementary video content) received via the unicast stream.

Although the blocks of the method 500 are described in a particular order, the steps associated with each block may be performed sequentially in any order, simultaneously, or overlapping in time. For example, in some implementations, the network service provider identifies the plurality of segments (in block 520) and generates the segment metadata (in block 530) as the media content is received (in block 510). Similarly, while the media content is received (in block 510), the network service provider can transmit (in block 540) segments corresponding to media content received earlier and make those segments available for retrieval (in block 550). In some implementations, each segment is made available for retrieval (in block 550) just after the segment has been broadcast (in block 540). In some implementations, the network service provider makes each segment of the plurality of segments available for retrieval via the unicast stream (in block 550) while the segment is being broadcast (in block 540).

Figure 6:
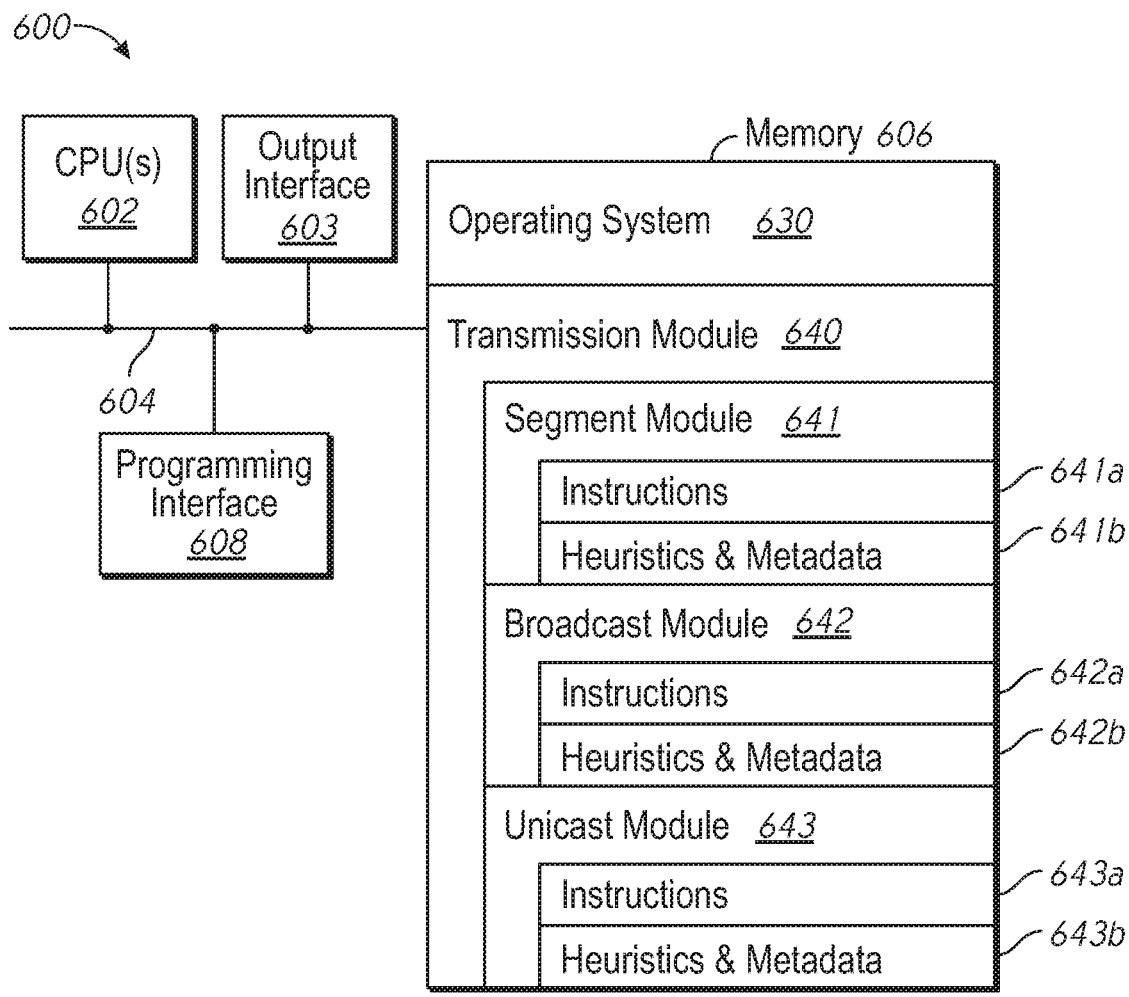
FIG. 6 is a block diagram of a computing device in accordance with some implementations.

FIG. 6 is a block diagram of a computing device 600 in accordance with some implementations. In some implementations, the computing device 600 corresponds to the network service provider 211 of FIG. 2 and performs one or more of the functionalities described above with respect to the network service provider 211. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPU's) 602 (e.g., processors), one or more output interfaces 603 (e.g., a network interface), a memory 606, a programming interface 608, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and a transmission module 640. In some implementations, one or more instructions are included in a combination of logic and non-transitory memory. The operating system 630 includes procedures for handling various basic system services and for performing hardware dependent tasks. In some implementations, the transmission module 640 is configured to transmit a synchronized broadcast stream and a unicast stream. To that end, the transmission module 640 includes a segment module 641, a broadcast module 642, and a unicast module 643.

In some implementations, the segment module 641 is configured to identify a plurality of segments of media content, each of the plurality of segments including a plurality of media frames. In some implementations, the segment module 641 is configured to generate segment metadata for each of the plurality of segments, the segment metadata including a segment identifier. To that end, the segment module 641 includes a set of instructions 641*a* and heuristics and metadata 641*b*. In some implementations, the broadcast module 642 is configured to transmit a broadcast stream including the plurality of segments and the segment metadata for each of the plurality of segments. To that end, the broadcast module 642 includes a set of instructions 642*a* and heuristics and metadata 642*b*. In some implementations, the unicast module 643 is configured to make the plurality of segments available for retrieval via a unicast stream. To that end, the unicast module 643 includes a set of instructions 643*a* and heuristics and metadata 643*b*.

Although the transmission module 640, the segment module 641, the broadcast module 642, and the unicast module 643 are illustrated as residing on a single computing device 600, it should be understood that in other embodiments, any combination of the transmission module 640, the segment module 641, the broadcast module 642, and the unicast module 643 reside in separate computing devices in various implementations. For example, in some implementations each of the transmission module 640, the segment module 641, the broadcast module 642, and the unicast module 643 reside on a separate computing device.

Figure 7:
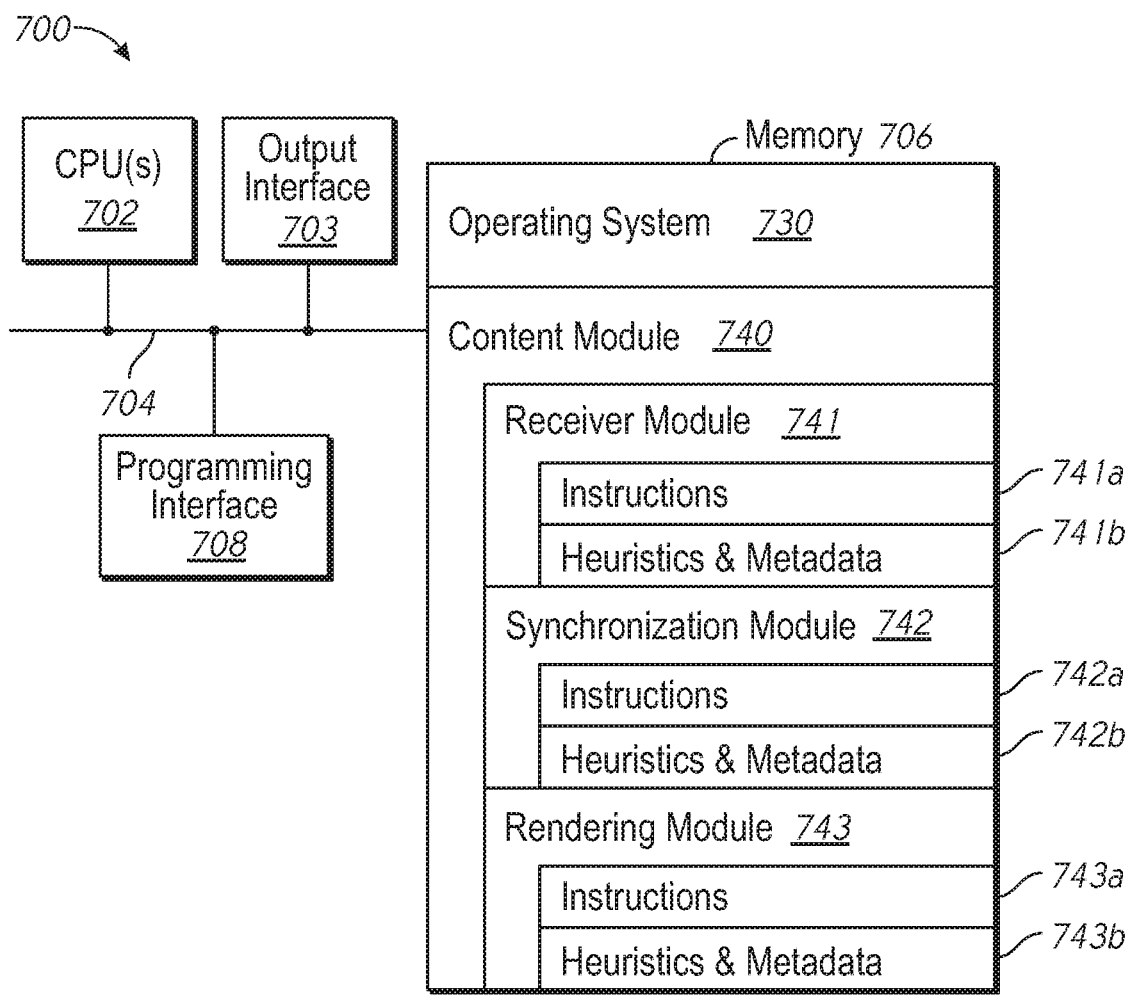
FIG. 7 is block diagram of another computing device in accordance with some implementations.

FIG. 7 is block diagram of another computing device 700 in accordance with some implementations. In some implementations, the computing device 700 corresponds to the user device 121 of FIG. 1 and performs one or more of the functionalities described above with respect to the user device 121. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703 (e.g., a network interface), a memory 706, a programming interface 708, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some implementations, the memory 706 or the non-transitory computer readable storage medium of the memory 706 stores the following programs, modules and data structures, or a subset thereof including an optional operating system 730 and a content module 740. In some implementations, one or more instructions are included in a combination of logic and non-transitory memory. The operating system 730 includes procedures for handling various basic system services and for performing hardware dependent tasks. In some implementations, the content module 740 is configured to seamlessly transition between a broadcast stream and a unicast stream. To that end, the content module 740 includes a receiver module 741, a synchronization module 742, and a rendering module 743.

In some implementations, the receiver module 741 is configured to receive a broadcast stream including a first segment of media content and data identifying the first segment. In some implementations, the receiver module 741 is configured to download a second segment of the media content from a unicast server. In some implementations, the receiver module 741 is configured to download a first segment of media content from a unicast server. In some implementations, the receiver module 741 is configured to receive a broadcast stream including a plurality of broadcast segments and data identifying the plurality of broadcast segments. To that end, the receiver module 741 includes a set of instructions 741*a* and heuristics and metadata 741*b*.

In some implementations, the synchronization module 742 is configured to identify, based on the data identifying the first segment, the second segment. In some implementations, the synchronization module 742 is configured to identify, based on the data identifying the broadcast segments, one of the plurality of broadcast segments as a second segment of the media content. To that end, the synchronization module 742 includes a set of instructions 742*a* and heuristics and metadata 742*b*.

In some implementations, the rendering module 743 is configured to render the first segment and the second segment without delay between the first segment and the second segment. To that end, the rendering module 743 includes a set of instructions 743*a* and heuristics and metadata 743*b*.

Although the content module 740, the receiver module 741, the synchronization module 742, and the rendering module 743 are illustrated as residing on a single computing device 700, it should be understood that in other embodiments, any combination of content module 740, the receiver module 741, the synchronization module 742, and the rendering module 743 reside in separate computing devices in various implementations. For example, in some implementations each of content module 740, the receiver module 741, the synchronization module 742, and the rendering module 743 reside on a separate computing device.

Moreover, FIGS. 6 and 7 are intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIGS. 6 and 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at a user device including a processor, a memory, and one or more network interfaces:
receiving, in a plurality of packets, a broadcast stream from a broadcast server, wherein the broadcast stream includes a plurality of segments including a first segment of media content, and segment metadata for each of the plurality of segments including data identifying the first segment, and the segment metadata for each of the plurality of segments is included in-band in a respective field of a first packet of the plurality of packets for each of the plurality of segments;
identifying, based on the data identifying the first segment from the first packet, a second segment of the media content;
downloading a unicast stream including the second segment from a unicast server; and
rendering the first segment and the second segment without delay between the first segment and the second segment.

2. The method of claim 1, wherein downloading the unicast stream including the second segment from the unicast server is performed in order to provide timing flexibility in consuming the media content.

3. The method of claim 1, wherein identifying the second segment includes:
obtaining a manifest from the broadcast server indicating the plurality of segments of the media content available for retrieval from the unicast server and an order of the plurality of segments; and
identifying based on the manifest, as the second segment, a next segment following the first segment in the order of the plurality of segments.

4. The method of claim 3, further comprising:
identifying based on the manifest, as a third segment, a next segment following the second segment in the order of the plurality of segments;
downloading the third segment in the unicast stream from the unicast server; and
rendering the third segment without delay between the second segment and the third segment.

5. The method of claim 3, wherein the manifest is updated by the broadcast server to identify the plurality of segments of the media content available for retrieval from the unicast server.

6. The method of claim 3, wherein obtaining the manifest comprises:
obtaining an earlier manifest that is before the manifest, wherein the earlier manifest indicates an earlier plurality of segments of the media content and an order of the earlier plurality of segments; and
obtaining the manifest after a delay in response to determining that the first segment is not included in the earlier plurality of segments, wherein the manifest is used to identify the second segment.

7. The method of claim 1, wherein receiving the broadcast stream includes receiving a broadcast stream clock used in rendering the first segment and in rendering the second segment.

8. The method of claim 1, wherein downloading the second segment from the unicast server is performed in response to receiving a content insertion marker in the segment metadata.

9. The method of claim 1, wherein the segment metadata includes a segment size to infer a number of lost packets in a segment and the method further includes:
determining whether to acquire the segment via the unicast stream.

10. A method comprising:
at a user device including a processor, a memory, and one or more network interfaces:
downloading a first segment of media content from a unicast server;
receiving, in a plurality of packets, a broadcast stream from a broadcast server, wherein the broadcast stream includes a plurality of broadcast segments and metadata identifying the plurality of broadcast segments, and the metadata for each of the plurality of broadcast segments is included in-band in a respective field of a first packet of the plurality of packets for each of the plurality of broadcast segments;
identifying, based on the metadata from the first packet, one of the plurality of broadcast segments as a second segment of the media content; and
rendering the first segment and the second segment without delay between the first segment and the second segment.

11. The method of claim 10, wherein receiving the broadcast stream is performed in order to provide a higher quality user experience.

12. The method of claim 10, further comprising:
identifying, based on the data identifying the broadcast segments, one of the plurality of broadcast segments as a third segment of the media content; and
rendering the third segment without delay between the second segment and the third segment.

13. The method of claim 10, wherein identifying the second segment includes:
obtaining a manifest indicating the plurality of broadcast segments of the media content and an order of the plurality of broadcast segments; and
identifying, as the second segment, a next segment following the first segment in the order of the plurality of broadcast segments.

14. The method of claim 13, further comprising:
obtaining an earlier manifest that is before the manifest, wherein the earlier manifest indicates an earlier plurality of broadcast segments of the media content and an order of the earlier plurality of broadcast segments; and
obtaining the manifest after a delay in response to determining that the second segment is not included in the earlier plurality of broadcast segments, wherein the manifest is used to identify the second segment.

15. The method of claim 10, wherein rendering the first segment is performed simultaneously with identifying the second segment.

16. A device comprising:
a processor;
one or more network interfaces; and
a non-transitory memory including:
a receiver module configured to:
receive, in a plurality of packets, from a broadcast server a broadcast stream including metadata identifying a plurality of segments, wherein the metadata for each of the plurality of segments is included in-band in a respective field of a first packet of the plurality of packets for each of the plurality of segments, and
download at least one of the plurality of segments from a unicast server;
a synchronization module configured to identify, based on the metadata from the first packet, whether a segment is included in the broadcast stream or available for retrieval from the unicast server; and
a rendering module configured to render a first segment and a second segment of the plurality of segments without delay between the first segment and the second segment.

17. The device of claim 16, wherein the rendering module renders each of the plurality of segments independently of others of the plurality of segments.

18. The device of claim 16, wherein the metadata includes a segment size to infer a number of lost packets in a respective segment and the device is further configured to determine whether to acquire the respective segment from the unicast server.

19. The device of claim 16, wherein the metadata is included in an adaptation field of the first packet of each segment of the plurality of segments.

20. The device of claim 16, wherein the metadata in the broadcast stream includes a content insertion marker that causes the receiver module to download the second segment from the unicast server.

* * * * *